United States Patent [19]

Brewer et al.

[11] Patent Number: 4,840,287

[45] Date of Patent: Jun. 20, 1989

[54] LOCKING MECHANISM FOR A PRESSURE COOKER

[75] Inventors: Edward L. Brewer; John M. Clark, both of Eaton, Ohio

[73] Assignee: Henny Penny Corporation, Eaton, Ohio

[21] Appl. No.: 188,292

[22] Filed: Apr. 29, 1988

[51] Int. Cl.⁴ .......................... B65D 45/00; F24D 1/00
[52] U.S. Cl. ...................................... 220/316; 99/403; 126/369; 220/324; 292/58
[58] Field of Search ................... 99/337, 403; 126/369, 126/377; 219/431, 440; 220/240, 316, 324, 325; 292/57, 58, 60, 61, 92-94, 253, 254, 335, 341.14, DIG. 11

[56] References Cited

U.S. PATENT DOCUMENTS

| | | | |
|---|---|---|---|
| 1,858,013 | 5/1932 | Heins | 220/316 |
| 2,917,200 | 12/1959 | Phelan et al. | 220/316 |
| 3,314,416 | 4/1967 | Wagner | 99/403 |
| 3,976,218 | 8/1976 | Stoermer | 220/316 |
| 4,159,063 | 6/1979 | Weber et al. | 220/316 |
| 4,362,148 | 12/1982 | Luebke et al. | 220/316 |
| 4,467,936 | 8/1984 | Makhijani | 220/316 |
| 4,485,936 | 12/1984 | Pardo et al. | 220/316 |
| 4,721,094 | 1/1988 | Nett | 99/403 |

Primary Examiner—Jimmy G. Foster
Attorney, Agent, or Firm—Frost & Jacobs

[57] ABSTRACT

A simple to operate locking mechanism for a pressure cooker, the locking mechanism having a locking arm rotatable from a fully open to a fully locked position, the locking arm being operatively connected to a cam shaft assembly which is rotatable with the locking arm, the cam shaft assembly being slidably axially in a cam shaft sleeve rotatably mounted in a displacement member which causes the cam shaft assembly to be axially displaced as it is rotated by the locking arm, the cam shaft assembly being moveable from a retracted to an extended position as the locking arm moves from a fully open to an intermediate position. A safety mechanism is provided to prevent rotation of the locking arm from the intermediate to the fully locked position in the event the cam shaft assembly is not fully extended. A pressure responsive safety mechanism is also provided to prevent opening movement of the locking mechanism in the event the cooker is under pressure.

18 Claims, 7 Drawing Sheets

LOCKING MECHANISM FOR A PRESSURE COOKER

This invention relates to pressure cookers and has to do more particularly with an improved locking mechanism for the lid of the cooker.

BACKGROUND OF THE INVENTION

The present invention relates to pressure cookers of the types disclosed in U.S. Pat. Nos. 2,914,063, 3,314,416 and 3,976,218 in which the food is cooked in oil while maintained under pressure. The cooker is provided with a receptacle or vat in which the cooking oil is placed, the receptacle being covered by an hinged lid having a gasket around its perimeter which engages and seals against the upper edge of the receptacle when the lid is closed. In order to seal the lid against the receptacle, a locking mechanism is provided which includes a rigid lock bar having a latch at its front end which engages a tongue on the receptacle to latch the lid in place. The locking bar also mounts a spindle having a downwardly extending threaded rod which engages the lid, the arrangements being such that when the spindle is turned in one direction it exerts pressure on the lid and hence on the lid gasket and the top of the receptacle, thereby providing a pressure seal.

It is also been proposed to provide an interlock between the lid and the receptacle to prevent removal of the lid when the pressure within the receptacle is above a predetermined level. For example, as taught in U.S. Pat. No. 3,976,218, the lid is provided with a flexible metallic liner covering its inner surface, the liner serving in part as a diaphragm which engages a pin projecting through an opening in the lid. When the pressure within the receptacle exceeds a predetermined level, the flexible liner forces the pin outwardly for engagement with a locking collar forming a part of the spindle utilized to exert sealing pressure against the lid, the engagement of the pin with the locking collar preventing the spindle from turning in a lid-opening direction.

While the lid locking arrangements described above have been in widespread use, they are nonetheless subject to certain disadvantages. Paramount among these is the fact that unless the latch on the lock bar is securely engaged, there is the possibility that the latch will become disengaged and hence release the lid for opening movement irrespective of whether or not the spindle is locked. In addition, the closing and locking of the lid requires multiple manual operations, and also requires the use of both of the operator's hands.

In contrast to the foregoing, the present invention provides a simple and positive locking mechanism which permits one-hand operation.

SUMMARY OF THE INVENTION

In accordance with the present invention, the locking mechanism comprises a locking arm adapted to be rotated through 180 degrees from an open position to a fully locked position. When in the open position, the locking mechanism is provided with a detent which permits the locking arm to be utilized as a lift handle for raising and lowering the lid.

The locking arm incorporates a cam mechanism including a locking cam which, as the locking arm is rotated toward the locked position, engages a locking bar mounted on the receptacle, the configuration of the locking cam being such that increasing pressure will be exerted against the lid to force its gasket into sealing engagement with the rim of the receptacle. The cam mechanism also includes a locking pin which prevents rotation of the locking arm in the event the positioning of the parts is such that the locking cam will not enter into proper engagement with the locking bar. Thus, the lid cannot be sealed and hence pressure built up in the cooking receptacle unless the locking cam is properly seated relative to the locking bar and the locking arm moved to the fully closed position.

Once the lid has been fully locked and pressure has been built up in the pot, a pressure sensitive safety arm is provided which engages and secures the locking cam against movement in the opening direction. To this end, the lid of the pot is provided with a flexible metallic liner which serves as a diaphragm acting upon the application of pressure against the liner to move the safety arm from an inoperative to an operative position. When in the operative position, the safety arm engages and holds the locking cam mechanism against movement in the opening direction.

A further safety feature is provided in the event the safety arm fails to perform its intended function. To this end, as the locking arm is rotated from the fully locked position toward the open position, the locking cam will remain in engagement with the locking bar but nonetheless will permit a slight separation between the lid and the rim of the receptacle so that the pressure in the receptacle will be relieved prior to the time the locking cam is released from engagement with locking bar.

DESCRIPTION OF THE PREFERRED EMBODIMENT

Figure 1:
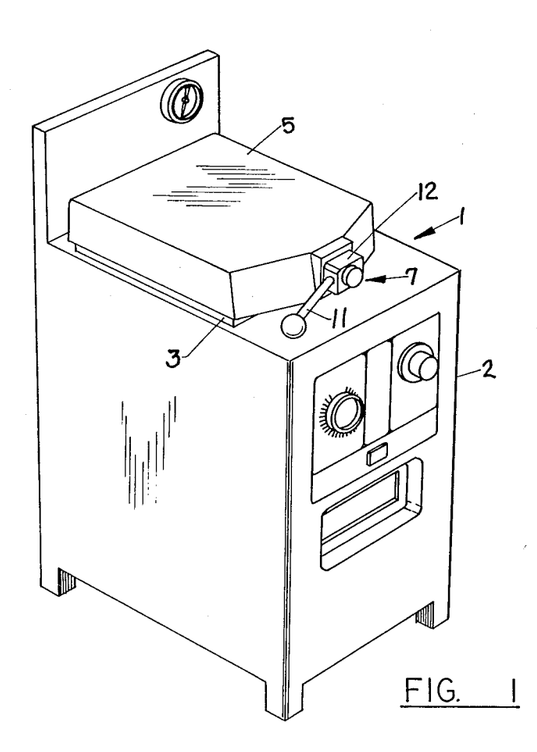
FIG. 1 is a fragmentary perspective view of a pressure cooker in accordance with the present invention, with the lid in the closed and locked position.
Figure 2:
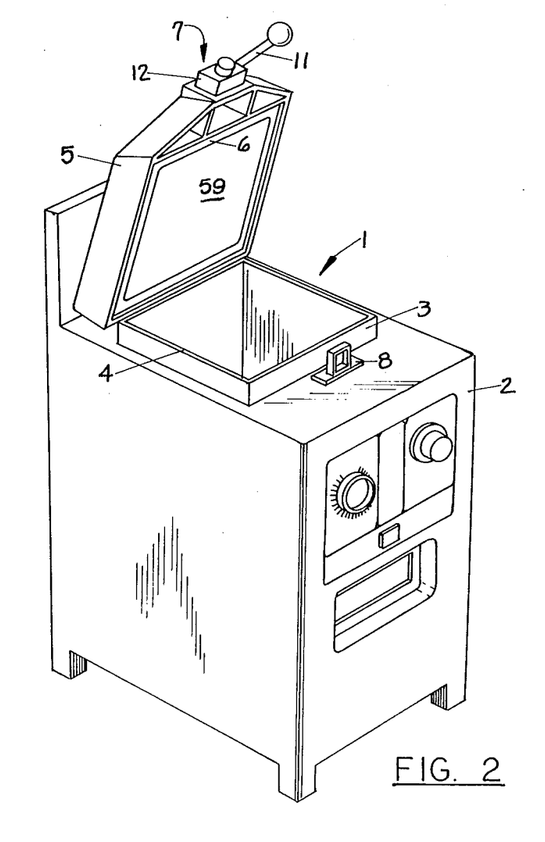
FIG. 2 is a fragmentary perspective view similar to FIG. 1 with the lid open.

Referring first to FIGS. 1 and 2, the pressure cooker 1 generally comprises a housing 2 mounting a receptacle or vat 3 having an open upper end 4. A lid 5 is hingedly connected to the rear of the receptacle 3, the lid being manually moveable from the closed position illustrated in FIG. 1 to the open position illustrated in FIG. 2. On its inner side the lid mounts a sealing gasket 6 adapted to seat on the open upper end 4 of the receptacle 3.

The lid 2 is provided with a locking mechanism, indicated generally at 7, which acts to lock the lid 5 in sealing engagement with the receptacle 3 when the lid is in the closed position. As seen in FIG. 2, the locking mechanism 7 is adapted to interacts with a locking bar 8 mounted on the cooker at the front of the receptacle 3.

Figure 3:
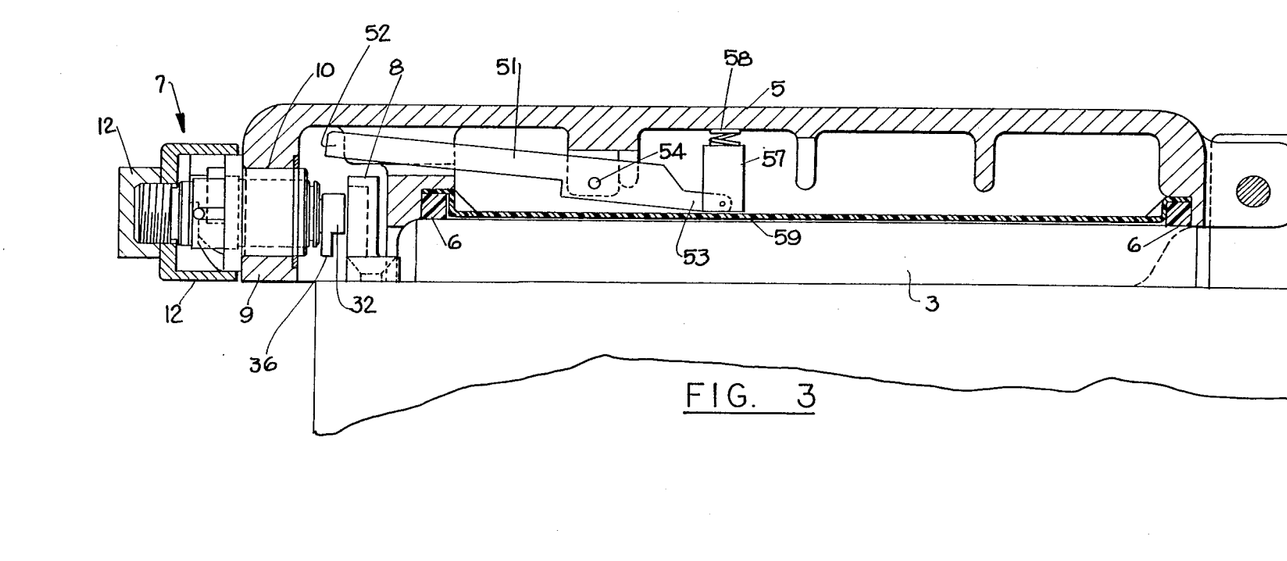
FIG. 3 is a sectional view taken along the line III—III of FIG. 5 showing the locking mechanism in the unlocked position and the safety arm in the inoperative position.
Figure 4:
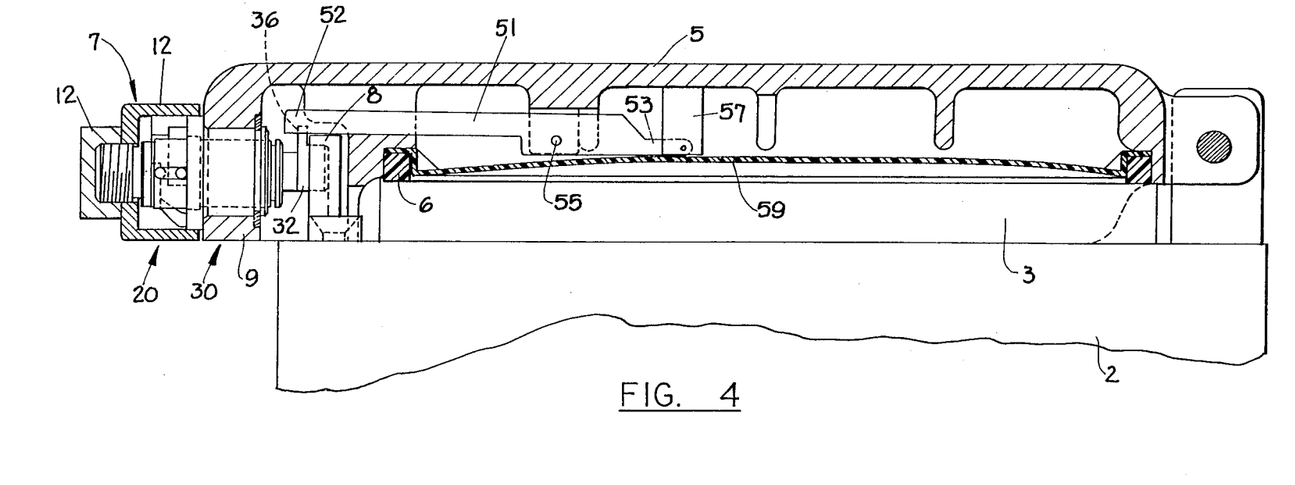
FIG. 4 is a vertical sectional view similar to FIG. 3 showing the locking mechanism in the fully locked position and the safety arm in the operative position.

As seen in FIGS. 3 and 4, the lid 5, which is preferably of cast construction, has a down-turned peripheral flange 9, the front wall of which is provided with a bore 10 in which the locking mechanism 7 is seated, the locking mechanism being actuated by an elongated locking arm 11 (FIGS. 1 and 2) having a hub 12, the locking arm 11 also serving as a convenient lifting handle by means of which the lid may be raised and lowered when the locking arm is in the fully open position.

Figure 6:
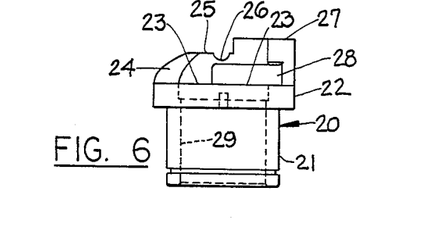
FIG. 6 is a side elevational view of the displacement member.
Figure 7:
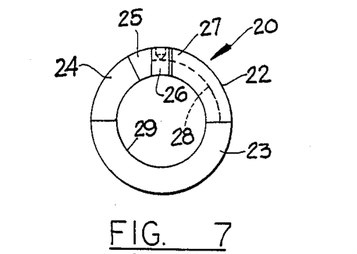
FIG. 7 is a top plan view of the displacement member.
Figure 8:
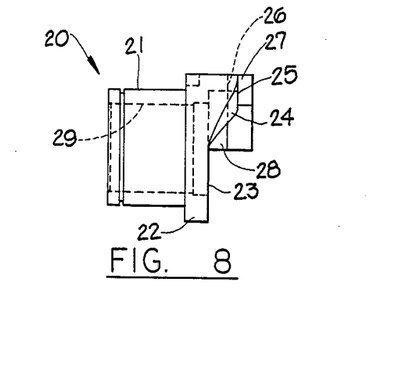
FIG. 8 is a side elevational view of the displacement member taken from the left side of FIG. 7.
Figure 9:
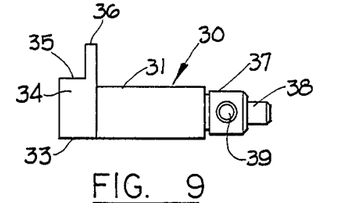
FIG. 9 is a side elevational view of the cam shaft and locking cam.
Figure 10:
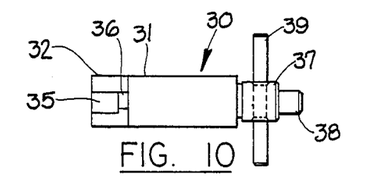
FIG. 10 is a top plan view of the cam shaft and locking cam.
Figure 11:
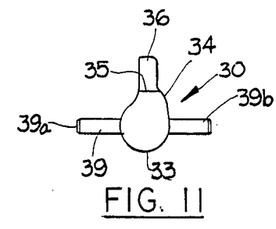
FIG. 11 is an end elevational view taken from the left side of FIG. 10.
Figure 12:
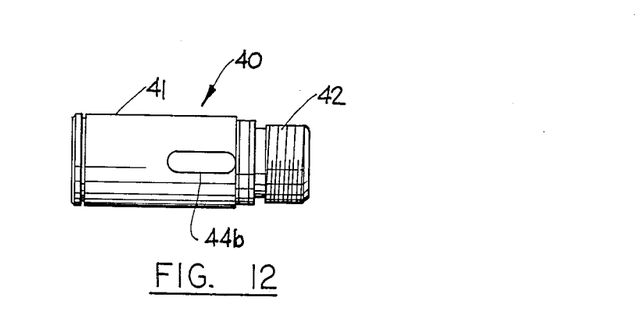
FIG. 12 is a side elevational view of the cam shaft bearing.

The principal components of the locking mechanism comprise the displacement member 20 seen in FIGS. 6, 7 and 8, the cam shaft assembly 30 seen in FIGS. 9, 10 and 11, and the cam shaft sleeve 40 seen in FIG. 12. These components are adapted to be interfitted one within the other in the manner hereinafter described and shown in FIG. 14.

Considering first the displacement member 20, it comprises an annular body 21 having an enlarged head or collar 22 the upper surface of which defines an annular cam track having a lower planar segment 23, an intermediate inclined segment 24, and an upper planar segment 25 having a detent 26 therein, the upper segment 25 terminating at the wall 27 having an inwardly opening arcuate groove 28 formed therein, the undersurface of which lies in prolongation of the lower planar cam segment 23. A vertical bore 29 extends axially through both the annular body 21 and the enlarged head 22.

As will be apparent from FIG. 7, the lower planar cam track segment 23 defines a 180° arc, whereas the arc of the inclined segment 24 is somewhat less than 90°, with the upper planar segment 25 completing the quadrant in which the inclined segment 24 is located and extending slightly therebeyond. In similar fashion, the arcuate groove 28 has an arc somewhat in excess of 90° with its closed end underlying and extending just beyond the detent 26. The body 21 of the displacement member is of a size to be just nicely received in the bore 10 in the lid 5, as will be evident from FIG. 3 wherein it will be seen that the undersurface of the enlarged head 22 seats against the outer surface of the down-turned flange 9 of the lid in the area immediately surrounding the bore 10.

Turning next to FIGS. 9-11 which illustrate the cam shaft assembly 30, the assembly comprises a cylindrical cam shaft 31 having a locking cam 32 fixedly secured to one end thereof, the cam having an essentially circular segment 33 which terminates in a progressively enlarged segment 34 which in turn terminates in the flat segment 35. Adjacent the flat segment 35 is a projecting finger 36 which extends normal to the longitudinal access of the shaft 31.

At its opposite end the cylindrical shaft 31 terminates in a reduced diameter cylindrical head 37 subtended by a smaller diameter cylindrical tip 38. A guide pin 39 extends transversely through the center of the head 37, the pin having opposing ends 39a and 39b.

Figure 13:
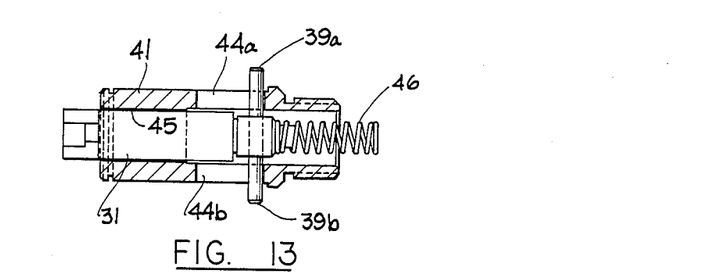
FIG. 13 is a sectional partially exploded view illustrating the cam shaft fitted within the cam shaft bearing.
Figure 14:
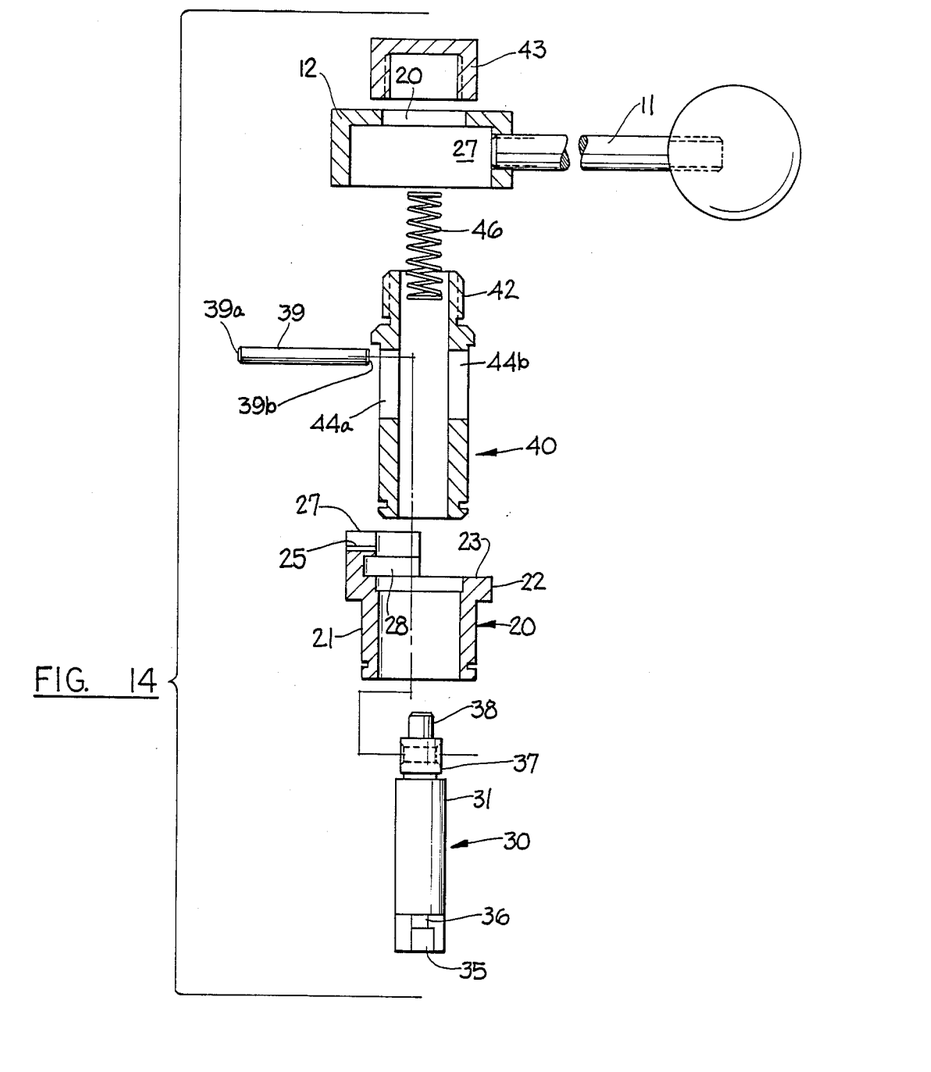
FIG. 14 is an exploded view illustrating the major components of the locking mechanism.

Turning next to FIG. 12 which illustrates the cam shaft sleeve 40, it comprises a hollow cylindrical sleeve 41 having a slightly reduced threaded section 42 at one end thereof which, as seen in FIG. 14, is adapted to receive the internally threaded cap 43 which acts operatively to connect the locking arm 11 to the sleeve 40 when the parts are assembled. The sleeve 41 also has a diametrically disposed pair of longitudinally extending slots 44a, 44b therein. The inner diameter 45 of the sleeve is of a size to slidably receive therein the cylindrical shaft 31 of the cam shaft assembly, as will be evident from FIG. 13, with the opposing ends 39a and 39b of the pin 39 extending through the slots 44a and 44b, respectively. One end of a coil spring 46 surrounds the tip 38, the spring projecting axially outwardly through the threaded section 42 for engagement by the cap 43. When the coil spring 46 is compressed, it will urge the cam shaft assembly outwardly to a position in which the opposite ends of the pin 39 seat against the opposite ends of the slots 44a and 44b. The position illustrated in FIG. 13 is the retracted position of the cam shaft assembly, whereas the cam shaft assembly will be in its extended position when the guide pin 39 contacts the opposite ends of the slots 44a and 44b.

During assembly, the displacement member 20, the cam shaft assembly 30 and the cam shaft sleeve 40 assume the relationship illustrated in FIG. 14, and when the parts are assembled the opposite ends of the guide pin 39 will overly and follow the cam track segments 23, 24 and 25 forming a part of the displacement member 20. When the locking arm 11 is at its fully open position which, for convenience of reference, will be referred to as the three o'clock position, end 39a of guide pin 39 will be seated in detent 26 on the upper planar cam track segment 25, the pin being urged into resilient engagement with the detent by means of the coil spring 46. This serves to releasably maintain the locking arm in the fully open position so that it may be utilized as a handle to raise and lower the lid since it will take positive rotational movement of the locking arm to release the detent.

Figure 15:
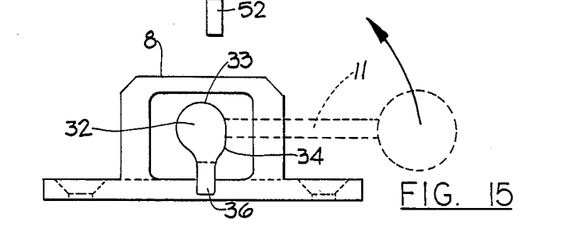
FIG. 15 is a diagrammatic elevational view showing the relationship between the locking mechanism and the locking bar when the locking arm is in the fully open position.

The fully open position of the locking mechanism is also shown in FIG. 15, wherein it will be seen that when the locking arm 11 is in the fully open position, the cam 32 will be positioned with its smallest diameter circular segment 33 uppermost and the projecting finger 36 extending downwardly. In addition, the cam shaft assembly will be in the retracted position and hence will lie outwardly relative to the locking bar 8, as will be seen in FIG. 3.

When the locking arm is rotated, it will first cause the end 39a of pin 39 to be released from the detent 26, whereupon the end 39a of the pin will travel for a short distance along the upper planar cam track segment 25 and then downwardly along the intermediate inclined cam track segment 24 which permits the cam shaft assembly to move toward its extended position, i.e. the cam 32 will be projected inwardly so as to underlie the locking bar 8, as will be seen in FIG. 4. The cam shaft assembly reaches the fully extended position as the end 39a of the guide pin reaches the lower planar cam track segment 23. During the axial movement of the cam shaft assembly, the cam 32 will be rotated through approximately 90° so that the cam 32 will assume the position illustrated in FIG. 16. At the same time, the end 39b of the guide pin will seat on the opposite end of the lower cam track segment 23 and hence will be positioned for entry into the open end of the arcuate groove 28.

If for any reason the cam shaft assembly fails to reach the fully extended position, the end 39b of the guide pin 39 will not be aligned for entry into the arcuate groove 28 and hence further rotational movement of the locking arm toward the closed position will be prevented by reason of the end 39b of the guide pin striking the adjoining end of wall 27. Such arrangement prevents further closing movement of the parts in the event the cam 32 is not properly positioned beneath the locking bar 8 and hence avoids one of the problems inherent in earlier locking arrangements. If, for example, the cam 32 failed to reach its fully extended position, it would still be possible for the outermost edge of the cam 32 to just barely engage beneath the locking bar 8, in which event the cam might slip from the locking bar if the lid were jarred. However, with the present arrangement, the end 39b of the guide pin 39 cannot enter the arcuate groove 28 unless the cam is in its fully extended position and hence properly positioned beneath the locking bar 8.

Figure 17:
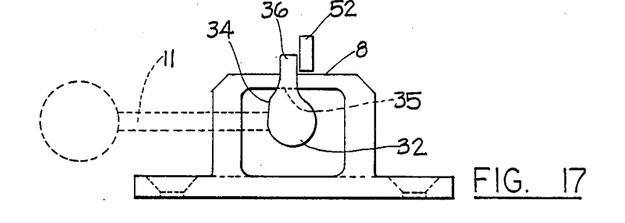
FIG. 17 is a diagrammatic view similar to FIGS. 15 and 16 illustrating the relationship of the parts when the locking arm is in the fully locked position.

When the guide pin 39 is properly positioned to enter the arcuate groove 28, the locking arm may be moved to the fully closed position, which is reached when the end 39b of the guide pin contacts the far end of the arcuate groove 28. Such movement results in the further rotation of the cam 32 through an angle of approximately 90°, such rotation causing the progressively radially enlarged segment 34 of cam 32 to press against the locking bar 8, such movement serving to draw the lid 5 into tight sealing engagement with the open end 4 of the underlying receptacle, the fully closed and sealed position being reached when the flat cam segment 35 seats against the undersurface of the locking bar 8. This condition is illustrated in FIG. 17. Once the locking arm 11 has reached the fully locked position, it requires a positive force to displace the locking arm for movement toward the unlocked position due to the flat cam segment 35.

Figure 18:
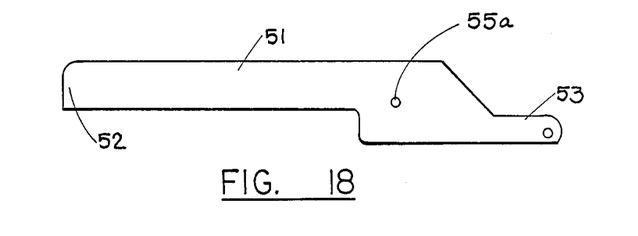
FIG. 18 is a side elevational view of the safety arm.
Figure 19:
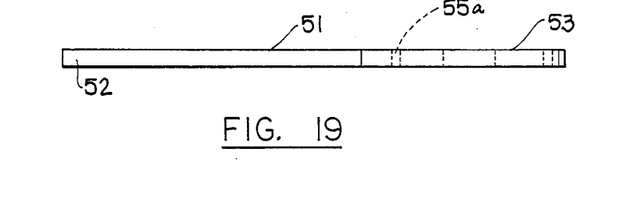
FIG. 19 is a bottom plan view of the safety arm.

In order to prevent opening movement of the locking arm while the closed receptacle is under pressure, a safety mechanism is provided which effectively locks the cam 32 and hence the locking arm 11 against rotational movement in the opening direction. This safety mechanism comprises a safety arm 51 seen in FIGS. 18 and 19 having a leading end 52 and a trailing end 53. As perhaps best seen in FIG. 5, the safety arm is adapted to be pivotally mounted between a pair of opposing lugs 54a, 54b on the undersurface of the lid 5, the lugs being recessed to receive a pivot pin 55 extending through the opening 55a in safety arm 51. The pivot pin is maintained in the recesses in the lugs 54a, 54b by means of cover plates 56a, 56b, respectively.

Referring to FIGS. 3 and 4, at its rearmost end the safety arm 51 is pivotally connected to a socket 57 containing a coil spring 58. The safety arm is shown in its inoperative position in FIG. 3 wherein it will be seen that the spring 58 acts to urge the trailing end 53 of the safety arm into contact with a flexible metallic liner 59 which covers the inner surface of the lid. The flexible liner 59 serves as a diaphragm which will flex in the direction of the lid when it is sealed and pressure is built-up in the receptacle. The displacement of the liner 59 when under pressure is shown in FIG. 4, the liner action to displace the trailing end 53 of the safety arm upwardly against the resistance of spring 58, thereby causing the safety arm to pivot in a counterclockwise direction about the pivot pin 55 to an operative position in which the leading end 52 is juxtaposed against a side edge of the finger 36, thereby effectively blocking rotation of the cam 32 toward the open position. This blocking action is also diagrammatically shown in FIG. 17, and it will be evident that the cam 32 cannot be rotated in the clockwise direction.

Figure 5:
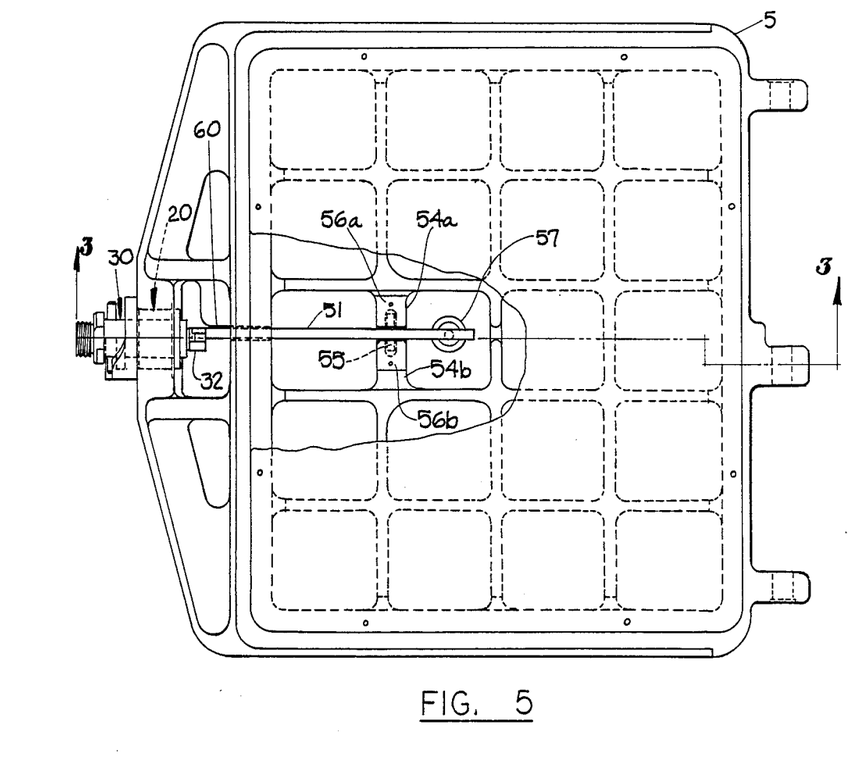
FIG. 5 is a bottom plan view of the lid with parts broken away.

As will be seen in FIG. 5, the leading end 52 of the safety arm is held against lateral displacement by an abutment 60 formed in the lid 5 which prevents lateral deflection of the safety arm even if excessive force is applied to the locking arm.

Under normal cooker operations, the pressure in the receptacle will be relieved prior to the opening of the lid, and consequently the safety arm will be returned to its inoperative position under the influence of the spring 58, thereby elevating the leading end 52 of the safety arm, which releases the cam 32 for rotation in the opening direction.

In the event there is a malfunction in the movement of the safety arm to the operative position, a further safety feature is provided to prevent the lid from being blown open in the event residual pressure remains in the closed receptacle. This additional safety feature is inherent in the configuration of the cam 32 keeping in mind that the cam shaft assembly 30 will remain in the fully extended position until the locking arm has been rotated through 90°, i.e. from the fully locked position to the intermediate position illustrated in FIG. 16. Until that point is reached, the cam shaft assembly remains fully extended due to the fact that the end 59b of the guide pin 59 is in engagement with the arcuate groove 28, and hence locked against movement to the retracted position which can occur only when the end 59a of the guide pin begins upward movement along the inclined cam track segment 24.

Figure 16:
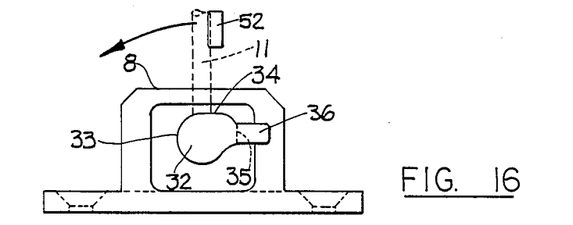
FIG. 16 is a diagrammatic view similar to FIG. 15 illustrating the relationship of the parts when the locking arm is in its intermediate position.

However, as the locking arm 11 is rotated from the fully locked position of FIG. 17 to the intermediate position of FIG. 16, the cam 32 will rotate through 90°, which rotation causes the flat segment 35 and the radially enlarged segment 34 of the cam to pass out of engagement with the locking bar 8, the locking bar being contacted by the reduced diameter circular segment 33 as the locking arm approaches the intermediate position. To the extent that there is remaining pressure in the receptacle, the progressive lessening in the radius of the cam 32 as segment 33 is rotated into contact with the locking bar effectively permits a slight separation between the lid and the top of the receptacle, thereby permitting the pressure to escape while the lid is still locked. In this connection, the down-turned peripheral flange 9 which surrounds the top of the receptacle will deflect the escaping fluid downwardly in a closely confined area.

As should now be evident, the present invention provides a positive locking mechanism for a pressure cooker which is simple to operate and incorporates a number of safety features which ensure positive locking of the lid before pressure can be built up in the receptacle, and also ensures that the lid cannot be opened until the pressure in the receptacle has been released.

What is claimed is:

1. In a pressure cooker having a receptacle with an open end, and a lid hingedly connected to the receptacle for movement from an open position to a closed position, the improvement comprising a locking mechanism adapted to be mounted on the lid and a locking bar adapted to be mounted on the receptacle at the open end thereof for engagement by said locking mechanism, said locking mechanism comprising an elongated locking arm rotatable from a fully open position to a fully closed position, a cam shaft operatively connected to said locking arm for rotation therewith, a locking cam mounted on one end of said cam shaft, and displacement means operative to displace said cam shaft axially from a retracted position to an extended position as said locking arm is rotated from its fully open position to an intermediate position, whereby to position said locking cam for engagement with said locking bar, continued rotation of said locking arm toward the fully locked position causing said locking cam to engage said locking bar, said locking cam being configured to cause the lid to be drawn into sealing engagement with the open end of the receptacle as the locking arm is moved from the intermediate position to the fully closed position.

2. The locking mechanism claimed in claim 1 wherein said displacement means comprises a hollow cylindrical body having an arcuate cam track at one end thereof, said cam shaft being slidably journaled in said cylindrical body, a cam follower on said cam shaft, and resilient means urging said cam follower into engagement with said cam track, whereby said cam follower will travel along said cam track as said cam shaft is rotated.

3. The locking mechanism claimed in claim 2 wherein said arcuate cam track comprises an upper planar segment, an intermediate inclined segment and a lower planar segment.

4. The locking mechanism claimed in claim 3 including an arcuate groove in said displacement member lying in prolongation of said lower planar cam track segment, and wherein said cam follower comprises an elongated pin extending laterally through said cam shaft, one end of said pin being adapted to be seated on said upper cam track segment when said locking arm is in the fully open position, the opposite end of said pin being to seat on said lower cam track segment adjacent said arcuate groove when said locking arm is moved to the intermediate position, said last named end of said pin traveling along said arcuate groove as said locking arm is moved from the intermediate to the fully locked position.

5. The locking means claimed in claim 4 including a detent in said upper cam track segment adapted to receive the first named end of said elongated pin when said locking arm is in the fully open position.

6. The locking mechanism claimed in claim 4 wherein said cam shaft is rotatably journaled in the hollow body of said displacement member by a tubular sleeve surrounding said cam shaft, said tubular sleeve having an opposing pair of elongated longitudinal slots therein in which the opposite ends of said pin are slidably received.

7. The locking mechanism claimed in claim 6 wherein said locking cam projects outwardly from one end of said tubular sleeve, wherein the opposite end of said sleeve mounts a removable cap, and wherein said resilient means comprises a helical spring extending between said cap and the adjacent end of said cam shaft.

8. The locking mechanism claimed in claim 1 wherein said locking cam has a first cam segment configured to lie immediately beneath said locking bar when said locking arm is in its intermediate position, and a second cam segment of progressively increasing diameter immediately adjacent said first cam segment, said second cam segment acting to contact and exert increasing pressure on said locking bar as said locking arm is moved from the intermediate to the fully closed position.

9. The locking mechanism claimed in claim 8 including a flat segment at the opposite end of said second cam segment adapted to seat against said locking bar when said locking arm is in the fully closed position.

10. The locking mechanism claimed in claim 9 including a finger on said locking cam, and pressure responsive means mounted on said lid, said pressure responsive means comprises a safety arm movable from an inoperative position to an operative position when said receptacle is under pressure, said safety arm, when in the operative position, being positioned to engage said finger upon attempted rotation of said locking arm from the fully closed position toward the intermediate position.

11. The locking mechanism claimed in claim 10 wherein said safety arm has a leading end and a trailing end and is pivotally connected to the inner surface of said lid intermediate its leading and trailing ends, and wherein said pressure responsive means includes a flexible liner acting as a diaphragm adapted to be displaced in the direction of the lid when the cooker is under pressure, and resilient means normally biasing said safety arm to the inoperative position in which position the trailing end of said safety arm is in contact with said liner, whereby displacement of liner in the direction of the lid acts to move the safety arm to its operative position.

12. The locking mechanism claimed in claim 11 wherein a socket is pivotally mounted on the trailing end of said safety arm, and wherein said resilient means comprise a helical spring extending between said socket and the lid.

13. A locking mechanism movable between a fully open position and a fully closed position, said locking means comprising:
   a displacement member,
   a bearing sleeve rotatably journaled in said displacement member,
   a cam shaft slidably journaled in said bearing sleeve,
   a locking cam on said cam shaft,
   operating means interconnecting said cam shaft and said bearing sleeve for joint rotation, said operating means engaging said displacement member, said displacement means acting through said operating means to axially displace said cam shaft upon rotation of said bearing sleeve, and
   a locking arm connected to said bearing sleeve for rotating said sleeve, whereby said locking cam is moved from the fully open position to the fully closed position upon rotation of said locking arm.

14. The locking mechanism claimed in claim 13 wherein said operating means comprises a guide pin extending laterally through said cam shaft with its opposite ends projecting outwardly beyond said cam shaft, said bearing sleeve having an opposing pair of elongated slots therein, the projecting ends of the guide pin extending through said slots.

15. The locking mechanism claimed in claim 14 wherein said displacement member is configured to define an arcuate cam track positioned to be contacted by the projecting ends of said guide pin, and resilient means operatively connected to said cam shaft for urging said guide pin into contact with said cam track.

16. The cam mechanism claimed in claim 15 wherein said cam track has a lower planar segment, an inclined intermediate section, and a planar upper segment.

17. The cam mechanism claimed in claim 16 wherein said displacement member includes an arcuate groove lying in prolongation of said lower cam track segment for receiving one end of said guide pin as said locking cam is rotated toward the fully closed position.

18. The cam mechanism claimed in claim 17 wherein said upper cam segment has a guide pin receiving detent positioned to be engaged by said guide pin when the locking cam is in the fully open position.

* * * * *